United States Patent
Tetrault et al.

(10) Patent No.: US 11,628,945 B2
(45) Date of Patent: Apr. 18, 2023

(54) OUTPUT POWER MANAGEMENT FOR ENGINES

(71) Applicant: PRATT & WHITNEY CANADA CORP., Longueuil (CA)

(72) Inventors: Philippe-Andre Tetrault, Boucherville (CA); Yves Cloutier, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 20 days.

(21) Appl. No.: 17/468,906

(22) Filed: Sep. 8, 2021

(65) Prior Publication Data
US 2023/0070587 A1    Mar. 9, 2023

(51) Int. Cl.
*B64D 31/06*    (2006.01)
*F02C 9/00*    (2006.01)
*B64F 5/60*    (2017.01)

(52) U.S. Cl.
CPC ............... *B64D 31/06* (2013.01); *B64F 5/60* (2017.01); *F02C 9/00* (2013.01); *F05D 2220/323* (2013.01); *F05D 2270/053* (2013.01); *F05D 2270/303* (2013.01)

(58) Field of Classification Search
CPC ... B64D 31/06; B64F 5/60; F02C 9/00; F05D 2220/323; F05D 2270/053; F05D 2270/303

USPC ........................................................ 60/641.15
See application file for complete search history.

(56) References Cited

U.S. PATENT DOCUMENTS

| 8,014,929 | B2 | 9/2011 | Page et al. |
| 10,442,544 | B2 | 10/2019 | Boyd et al. |
| 2011/0077895 | A1* | 3/2011 | Muramatsu ............... G01K 7/42 374/135 |
| 2021/0301737 | A1* | 9/2021 | Whittle ...................... F02C 9/00 |

FOREIGN PATENT DOCUMENTS

CN    102928232 A  *  2/2013

\* cited by examiner

*Primary Examiner* — J. Todd Newton
(74) *Attorney, Agent, or Firm* — Norton Rose Fulbright Canada LLP

(57) ABSTRACT

Methods and systems for operating an engine are provided. An engine core temperature is monitored. When the engine core temperature is below an engine thermal limit adjusted for a level of deterioration of the engine, an output power of the engine is set in accordance with a reference power based on non-thermal limits of the engine. When the engine core temperature is near or above the engine thermal limit adjusted for the level of deterioration of the engine, the output power of the engine is set to a value lower than the reference power based on non-thermal limits of the engine to reduce the engine core temperature.

18 Claims, 6 Drawing Sheets

OUTPUT POWER MANAGEMENT FOR ENGINES

TECHNICAL FIELD

The disclosure relates generally to engines and, more particularly, to systems and methods for setting the output power of an engine.

BACKGROUND

The output power of a gas turbine engine may be set in accordance with a reference power, and the reference power may be selected as a minimum from a thermal limit, a mechanical limit, and any other limit that may affect the power available for the engine. Fixed power schedules are associated with each limit, based on a plurality of engine and aircraft parameters such as altitude, ambient temperature, aircraft speed, and the like. While this approach to setting the output power is suitable for its purposes, improvements are desired.

SUMMARY

In accordance with a broad aspect, there is provided a method for operating an engine. An engine core temperature is monitored. When the engine core temperature is below an engine thermal limit adjusted for a level of deterioration of the engine, an output power of the engine is set in accordance with a reference power based on non-thermal limits of the engine. When the engine core temperature is near or above the engine thermal limit adjusted for the level of deterioration of the engine, the output power of the engine is set to a value lower than the reference power based on non-thermal limits of the engine to reduce the engine core temperature.

In another broad aspect, there is provided a system for operating an engine. The system comprises a processor and a non-transitory computer-readable medium having stored thereon program instructions. The program instructions are executable by the processor for monitoring an engine core temperature, when the engine core temperature is below an engine thermal limit adjusted for a level of deterioration of the engine, setting an output power of the engine in accordance with a reference power based on non-thermal limits of the engine, and when the engine core temperature is near or above the engine thermal limit adjusted for the level of deterioration of the engine, setting the output power of the engine to a value lower than the reference power based on non-thermal limits of the engine to reduce the engine core temperature.

In another broad aspect, there is provided a method for operating an engine. An output power of the engine is set in accordance with a reference power based on non-thermal limits of the engine. It is detected that an engine core temperature is greater or equal to an engine thermal limit, said engine thermal limit adjusted based on a level of deterioration of the engine. In response to the detecting, the output power of the engine is set to a value lower than the reference power until the engine core temperature reaches the engine thermal limit adjusted based on the level of deterioration of the engine.

BRIEF DESCRIPTION OF THE DRAWINGS

Reference is now made to the accompanying figures in which.

DETAILED DESCRIPTION

The present disclosure is directed to methods and systems for setting the output power of an engine. The power management approach considers the various constraints affecting the output power of the engine along the lines of thermal and non-thermal limits. Non-thermal limits are used to set the output power of the engine in accordance with a reference power, and a thermal limit is used to concurrently monitor an engine core temperature and intervene in power management only in certain circumstances, as will be explained in more detail below.

Figure 1:
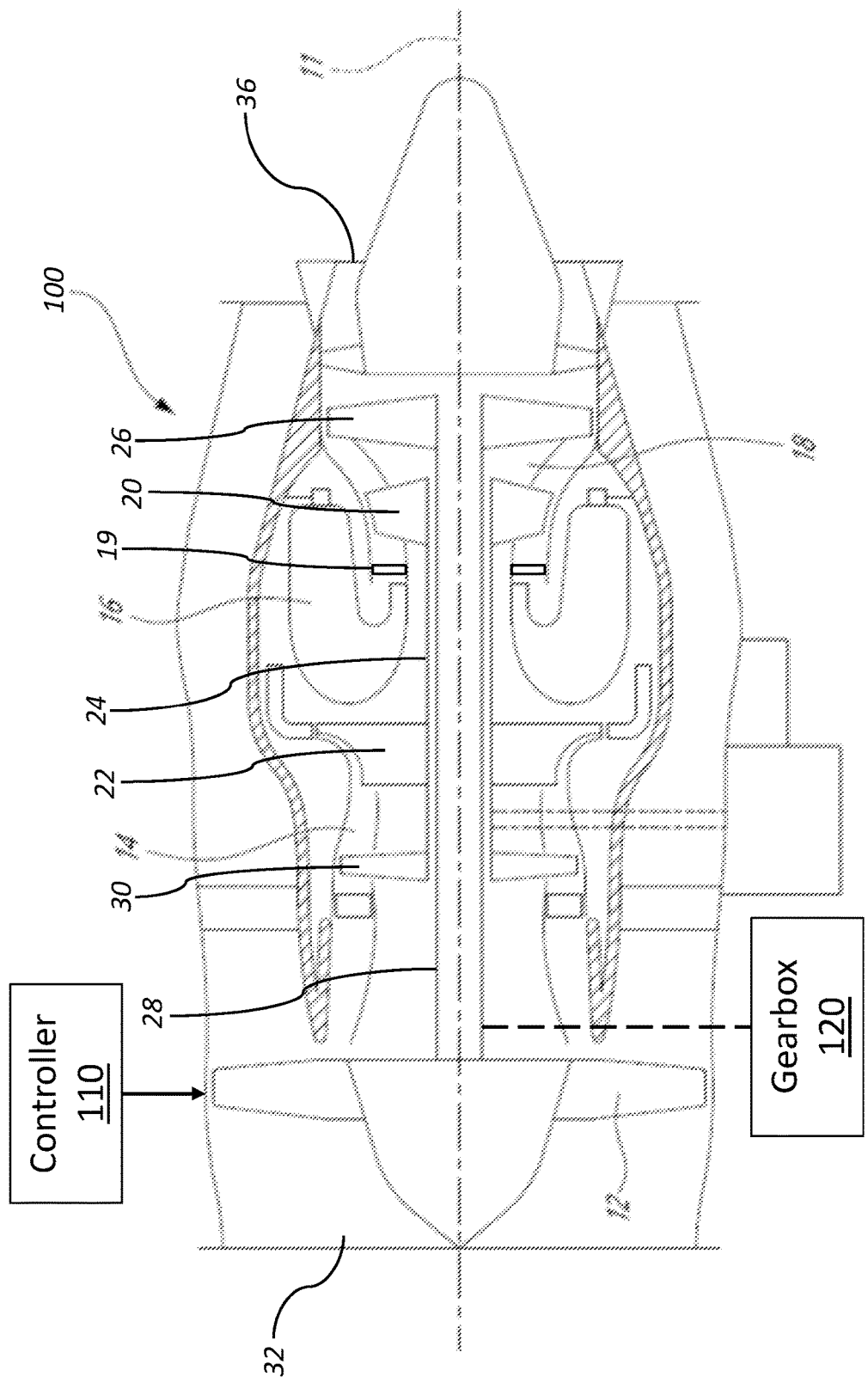
FIG. 1 is a schematic cross sectional view of a gas turbine engine.

The power management approach is applicable to various types of engines, such as gas turbine engines, hybrid engines, electric motors, and the like. In some embodiments, the power management approach as described herein is applicable to auxiliary power units. With reference to FIG. 1, an example gas turbine engine 100 of a type preferably provided for use in subsonic flight is illustrated, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases, which exit via an exhaust 36. High-pressure rotor(s) of the turbine section 18 (referred to as "HP turbine rotor(s) 20") are drivingly engaged to high-pressure rotor(s) of the compressor section 14 (referred to as "HP compressor rotor(s) 22") through a high-pressure shaft 24. The turbine section 18 includes a vane 19 between the combustor 16 and the HP turbine rotor(s) 20. Low-pressure rotor(s) of the turbine section 18 (referred to as "LP turbine rotor(s) 26") are drivingly engaged to the fan rotor 12 and to low-pressure rotor(s) of the compressor section 14 (referred to as "LP compressor rotor(s) 30") through a low-pressure shaft 28 extending within the high-pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply. According to the illustrated example, the engine 100 is provided in the form of a multi-spool engine having a high-pressure spool and a low pressure (LP) spool independently rotatable about axis 11. However, it is understood that a multi-spool engine could have more than two spools. It should also be noted that the embodiments described herein also consider the use of single-spool engines.

Control of the operation of the engine 100 can be effected by one or more control systems, for example a controller 110, which is communicatively coupled to the engine 100. The operation of the engine 100 can be controlled by way of one or more actuators, mechanical linkages, hydraulic systems, and the like. The controller 110 can be coupled to the actuators, mechanical linkages, hydraulic systems, and the like, in any suitable fashion for effecting control of the engine 100. The controller 110 can modulate the position and orientation of variable geometry mechanisms within the engine 100, the bleed level of the engine 100, and fuel flow, based on predetermined schedules or algorithms. In some embodiments, the controller 110 includes one or more FADEC(s), electronic engine controller(s) (EEC(s)), or the like, that are programmed to control the operation of the engine 100.

The controller 110 is configured for monitoring an engine core temperature and comparing it to a thermal limit of the engine. The thermal limit is adjusted for a level of deterioration of the engine. In this manner, the thermal limit used for power management of the engine gets corrected over the life of the engine, such that an older engine can output as much power as a new engine. In some embodiments, the thermal limit is adjusted by applying a deterioration bias to an actual thermal limit, as follows:

$$\text{Adjusted Thermal Limit} = \text{Actual Thermal Limit} + \text{Deterioration Bias} \quad (1)$$

The deterioration bias is associated with a level of deterioration of the engine and pushes the adjusted thermal limit higher on older engines to account for a change in performance of the engine over time. Any known or other method of determining a deterioration level of the engine may be used, such as but not limited to testing, simulations, modeling (e.g. state variable model (SVM)), and the like. A corresponding deterioration bias for the level of deterioration as determined is applied to the actual thermal limit to obtain the adjusted thermal limit.

Figure 2:
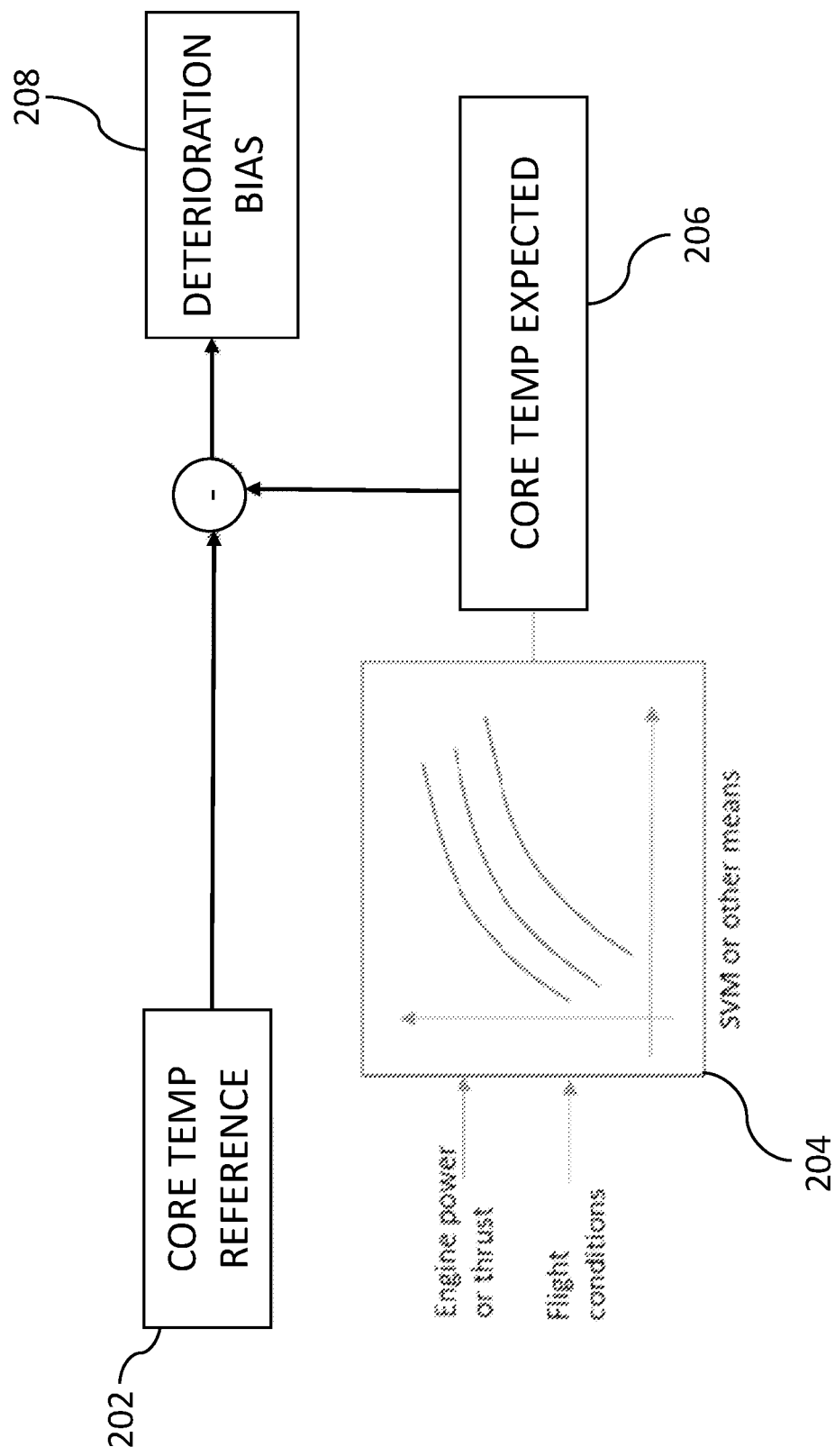
FIG. 2 is a block diagram of an example process for establishing the level of deterioration of the engine of FIG. 1 relative to a reference value.

In some embodiments, the deterioration bias corresponds to a difference between a reference engine core temperature and an expected engine core temperature, as exemplified in the diagram of FIG. 2. The reference core temperature 202 is an actual engine core temperature at a given reference condition, and is compared to the expected core temperature 206 at the same reference condition to obtain the deterioration bias 208. The expected core temperature 206 may be selected from a plurality of possible expected core temperatures 204, as a function of various parameters such as flight conditions (e.g. altitude, pressure, temperature, etc.), engine power, engine thrust, and the like. The expected core temperature 206 is the temperature expected for an engine without deterioration. The reference condition may be, for example at take-off, climb, cruise, idle, etc. The expected core temperature 206 also corresponds to a core temperature expected for the reference condition, and the possible expected core temperatures 204 may also vary as a function of the reference condition at which the actual core temperature is obtained.

In some embodiments, the actual core temperature is established via an engine power assurance check (EPAC). by using a state variable model, or any various other forms of trend monitoring. In one specific and non-limiting example, the reference condition used is a flight take-off condition. During the aircraft's take-off phase of the first flight of the day, engine data upon lift-off is recorded, and comprises the engine core temperature at the take-off phase. The controller 110 may use the aircraft and/or engine parameters at the take-off phase to select the expected core temperature of the engine and compute the deterioration bias accordingly.

In some embodiments, the value of the deterioration bias may be adjusted over time to account for various transient effects, for instance those associated with the setting of engine component clearances. Additionally or alternatively, the value of the deterioration bias may be scaled to take into account the fact that the deterioration recorded at, for instance, a take-off condition may not apply to all conditions across the flight envelope in the same way. For example, the deterioration bias at a take-off condition for an outside temperature of 10 degrees Celsius may be equivalent to the deterioration bias at a max take-off condition for an outside temperature of 14 degrees Celsius. Other scale factors may be contemplated as well.

In some embodiments, to account for variability and data scatter when recording deterioration bias values, the deterioration bias may be confirmed by calculating deterioration bias values at multiple points during the aircraft's flight. For instance, deterioration bias values may be calculated at a take-off condition, during a climbing condition, and at a cruising condition. Other conditions for calculating the deterioration bias may be contemplated as well. A rolling average of recently-calculated deterioration bias values, for instance the ten most-recent deterioration bias values, may be used to limit variations.

Figure 3:
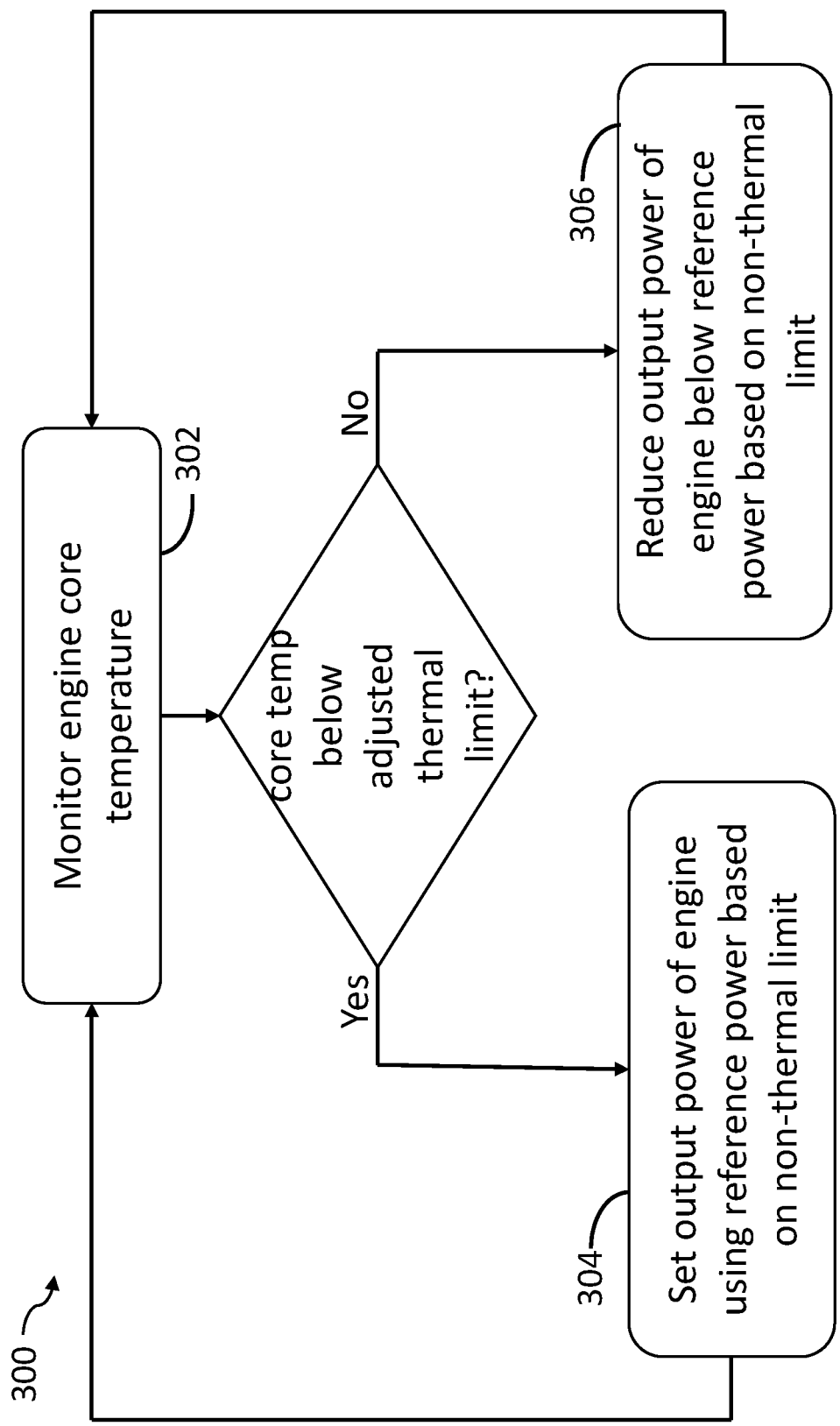
FIG. 3 is a flowchart illustrating an example method for operating the engine of FIG. 1.

Referring to FIG. 3, there is shown an exemplary method 300 for operating the engine 100 to set the engine's output power. Such method may be performed by the controller 110 in part or in whole.

Figure 4:
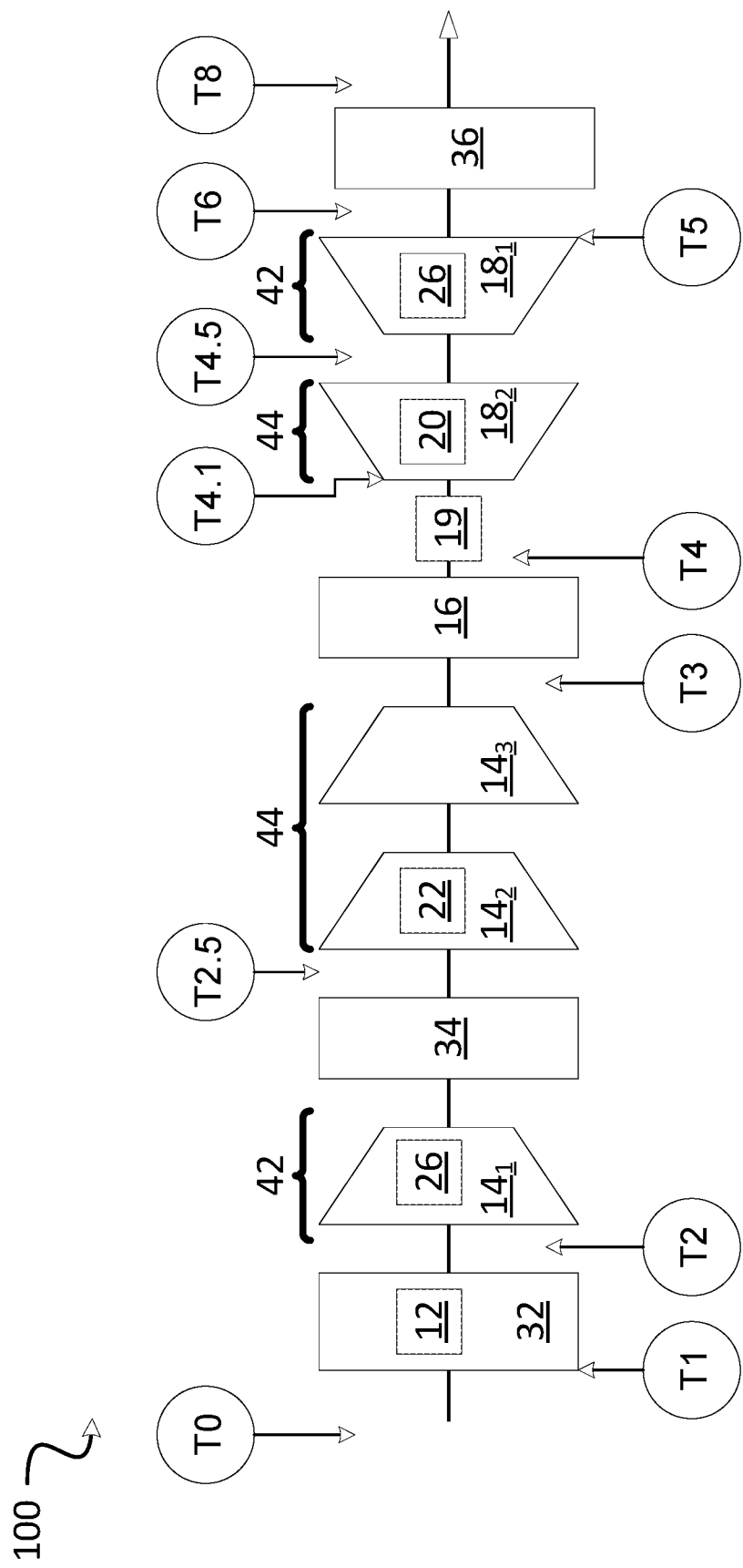
FIG. 4 is a simplified schematic view of the engine of FIG. 1.

At step 302, an engine core temperature is monitored. In some embodiments, monitoring the engine core temperature comprises measuring the actual core temperature using one or more real or virtual sensing device. Example temperature measurement locations of the engine 100 are illustrated in FIG. 4. TO, taken upstream of the inlet 32, refers to an ambient temperature of the environment surrounding the engine 100. Although illustrated here as being captured upstream of the inlet 32, it should be understood that the ambient temperature TO can be captured at any suitable location in the environment in which the engine 100 is operating. T1 refers to an inlet temperature, taken at the inlet 32 of the engine 100, just as the air from the environment enters through the fan rotor 12. T2 refers to a low-pressure compressor inlet temperature, taken before the LP turbine rotor(s) 26 of the low-pressure compressor stage $14_1$. T2.5 refers to a high-pressure compressor temperature, taken between the ICC 34 and the high-pressure compressor stage $14_2$. T3 refers to a high-pressure compressor delivery temperature, taken after the high-pressure compressor stages $14_2$ and $14_3$, for instance after the HP compressor rotor(s) 22. T4 refers to a combustor outlet temperature, taken before the HP turbine rotor(s) 20, and after the combustor 16. T4.1 refers to a temperature taken at or near an entry to the high-pressure turbine $18_2$. Measurements for T4.1 can serve as a proxy for T4 because the exit of the combustor (where T4 is taken) and the entry to the high-pressure turbine $18_2$ (where T4.1 is taken) are connected to one another. T4.5 refers to a temperature taken between the high-pressure turbine $18_2$ and the low-pressure turbine $18_1$. T5 refers to the turbine outlet temperature, taken after the LP turbine rotor(s) 26 of the low-pressure turbine $18_1$. T6 refers to an exhaust gas temperature, taken between the low-pressure turbine $18_1$ and the exhaust 36. T8 refers to an exhaust gas temperature, taken at the outlet of the exhaust 36.

In some embodiments, the temperature used for the actual engine core temperature is the maximum temperature of the engine. The maximum temperature usually occurs at location T4 or at location T4.1, which may be difficult to measure in at least some engines due to possible instrumentation and material temperature limitations. One approach to overcoming such difficulties is deriving the temperature at location T4 based on a temperature measured downstream from location T4, where the temperature is cooler, and where instrumentation and material temperature limitations are lowered. One example includes measuring the temperature at location T4.5. T4.5 is sometimes referred to as an inter-turbine or indicated turbine temperature (ITT) and in this embodiment is taken between the HP turbine rotor(s) 20 and LP turbine rotor(s) 26. A relationship between the temperatures at locations T4 to T4.5, used for deriving the temperature at location T4, can be determined during the development phase of the engine 100. The relationship can be provided to the engine controller 110 to derive the T4 temperature as may be required for operation of the engine 100.

In some embodiments, monitoring the engine core temperature comprises estimating or deriving the actual engine core temperature. For example, an iterative method for predicting T4, as described in U.S. patent application Ser. No. 16/906,637 may be used. Other methods or algorithms for deriving or estimating the engine core temperature may be used.

Referring back to FIG. 3, and as part of step 302, it is determined if the engine core temperature is below an adjusted engine thermal limit. When the engine core temperature is below the adjusted thermal limit, the output power of the engine 100 is set in accordance with a reference power based on non-thermal limits of the engine, at step 304. In various embodiments, such non-thermal limits may comprise mechanical limits, for instance based on the speed of fan 12 or gearbox 120, or other engine 100 limits such as gas generator pressure and mechanical or corrected rotor speeds, among others. The reference power may be selected as a minimum from a plurality of non-thermal limits. Fixed power schedules may be associated with each non-thermal limit, based on a plurality of engine and aircraft parameters such as altitude, ambient temperature, aircraft speed, and the like.

When the engine core temperature is above the adjusted thermal limit, the output power of the engine 100 is set to a value lower than the reference power to reduce the engine core temperature, at step 306. Therefore, instead of using a fixed thermal limit to be considered with the mechanical limit and any other limit of the engine to set engine power, engine core temperature is used as a monitoring value in setting the engine power. The power management approach also concurrently manages engine temperature, and considers engine deterioration in temperature and power management.

In some embodiments, step 306 is performed before the core temperature is above the adjusted thermal limit. For example, if a trend of increasing engine core temperature is detected, step 306 may be performed when the engine core temperature is near or approaches the adjusted thermal limit. Various triggers may be used to cause step 306 to be performed prior to reaching the adjusted thermal limit. For example, a trigger such as a given number (X) of consecutive increases in core temperature and a difference between the core temperature and the adjusted thermal limit of less than a given difference threshold ($T_{diff}$) may cause the method 300 to move to step 306 before the adjusted thermal limit is reached by the core temperature:

Engine core temp−adjusted thermal limit<$T_{diff}$ AND
    Consecutive increases=$X$ In another example, the trigger may be that the difference between the core temperature and the adjusted thermal limit is less than the difference threshold ($T_{diff}$) for a duration greater than a given time threshold ($T_{time}$):

Engine core temp−adjusted thermal limit<$T_{diff}$ AND
    Duration≥$T_{time}$

In yet another example, the trigger may be that the difference between the core temperature and the adjusted thermal limit is less than the difference threshold ($T_{diff}$) and the last increase in temperature was for a value greater than an increase threshold ($T_{incr}$):

Engine core temp−adjusted thermal limit<$T_{diff}$ AND
    Last Increase≥$T_{incr}$ In some embodiments, a prediction algorithm, such as those implemented by a proportional-integral (PI) or proportional-integral-derivative (PID) controller, or a machine-learning algorithm, may be used to detect a trend or predict a crossing of the adjusted thermal limit by the engine core temperature and trigger step 306 prior to reaching the adjusted thermal limit. Various other triggers for triggering step 306 as the core temperature approaches the adjusted thermal limit will be readily understood by those skilled in the art.

Figure 5:
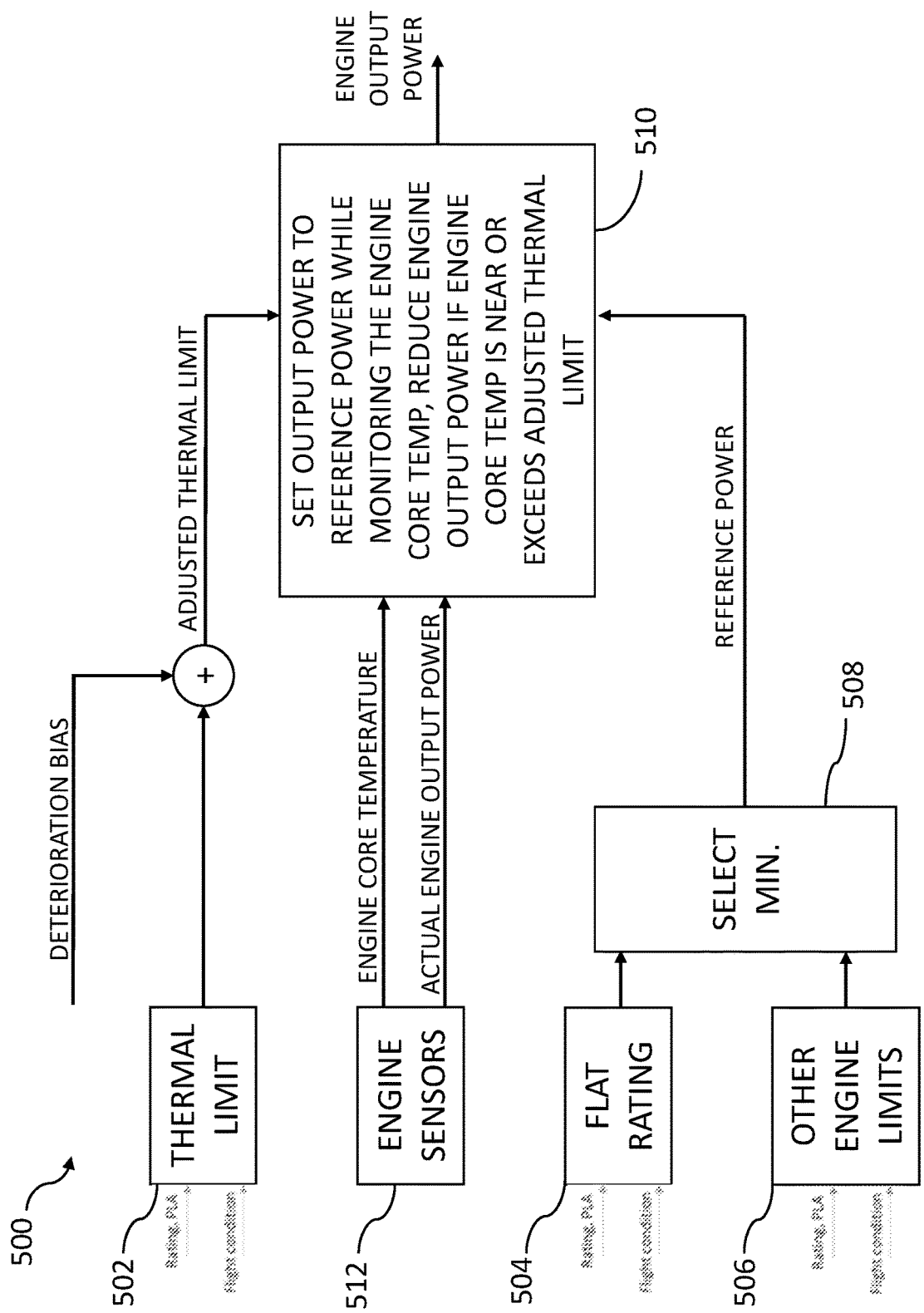
FIG. 5 is a block diagram of an example control scheme for setting an output power of the engine of FIG. 1.

Referring to FIG. 5, an exemplary control scheme 500 for setting the output power of the engine 100 is shown. As discussed above, non-thermal limits 504, 506 are used to set the output power of the engine 100 in accordance with a reference power, and a thermal limit 502 is used to concurrently monitor an engine core temperature and intervene in power management only in certain circumstances. The thermal limit 502 of the engine 100 may take into account, for instance, the engine's current rating (e.g. max takeoff, max continuous) and power lever angle (PLA). The thermal limit is then adjusted for the level of deterioration of the engine, for instance by applying the deterioration bias to the actual thermal limit to obtain an adjusted thermal limit. In some embodiments, the deterioration bias may be determined via the method exemplified in the diagram of FIG. 2, as discussed above. Other methods for determining the deterioration bias may be contemplated as well.

Non-thermal limits 504, 506 are used to set the output power of the engine 100 in accordance with a reference power. At 504, a flat rating, i.e. a mechanical limit of the engine 100, is determined. Such mechanical limits may be based on, for instance, the rotational speed of fan 12 or the rotational speed of gearbox 120. The flat rating may take into account, for instance, the engine's current rating, PLA and flight condition(s) of the aircraft. Similarly, at 506, other engine limits, for instance such as gas generator pressure and mechanical or corrected rotor speeds, are determined. Such other engine limits may take into account, for instance, the engine's current rating, PLA and flight condition(s) of the aircraft. Fixed power schedules may be associated with each non-thermal limit, based on a plurality of engine and aircraft parameters such as altitude, ambient temperature, aircraft speed, and the like. At 508, a minimum between the flat rating and the other engine limits may be selected and outputted as the reference power.

At 510, steps 302, 304 and 306 of method 300 may be implemented to set the engine's output power. Various engine sensors 512 positioned throughout engine 100 may monitor or detect a current engine core temperature. Such sensors may be real or virtual sensing devices, as discussed above. Sensors 512 may also monitor or detect an actual engine output power. As such, at 510 the engine power output is set to the reference power. The engine core temperature is concurrently monitored to ensure that it does not exceed the adjusted thermal limit. If the engine core temperature is near or exceeds the adjusted thermal limit, the output power of the engine 100 is set to a value lower than the reference power to reduce the engine core temperature. In various embodiments, the output power of the engine 100 may be set to a value lower than the reference power until the engine core temperature drops below the engine thermal limit adjusted based on the level of deterioration of the engine 100.

Figure 6:
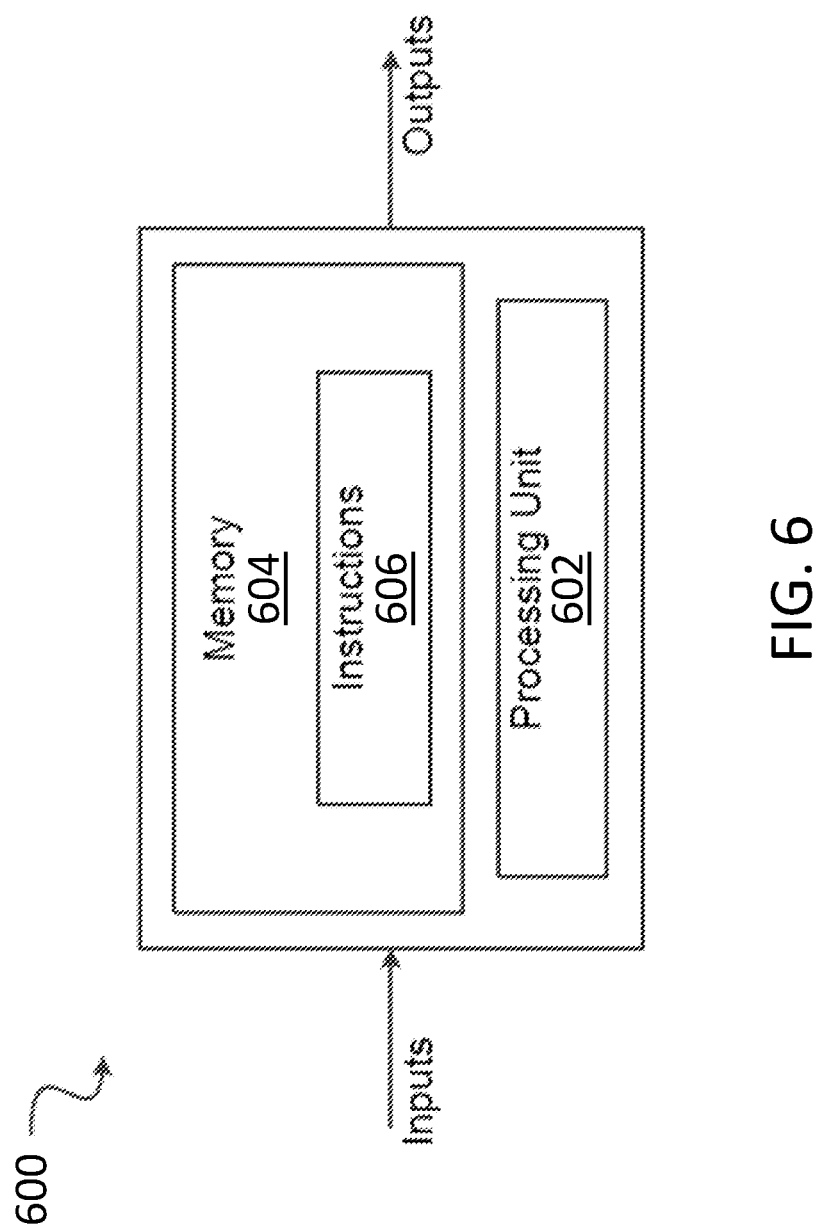
FIG. 6 is a block diagram of an example computing device.

In some embodiments, the controller 110 is implemented with a computing device 600, an example of which is illustrated in FIG. 6. For simplicity only one computing device 600 is shown but the controller 110 may include more computing devices 600 operable to exchange data. The computing devices 600 may be the same or different types of devices. Note that the controller 110 can be implemented as part of a full-authority digital engine controls (FADEC) or other similar device, including electronic engine control (EEC), engine control unit (ECU), and the like.

The computing device 600 comprises a processing unit 602 and a memory 604 which has stored therein computer-executable instructions 606. The processing unit 602 may comprise any suitable devices configured to implement the method 300 such that instructions 606, when executed by the computing device 600 or other programmable apparatus, may cause the functions/acts/steps performed as part of the method 300 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for operating the engine 100 described herein may be implemented in a high level procedural or object oriented programming or scripting language, or a combination thereof, to communicate with or assist in the operation of a computer system, for example the computing device 600. Alternatively, the methods and systems for operating the engine 100 may be implemented in assembly or machine language. The language may be a compiled or interpreted language. Program code for implementing the methods and systems for operating the engine 100 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the engine 100 may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the controller 110 may set the reference power to the flat rated power by default and lower or limit the output power if the engine core temperature crosses the adjusted thermal limit threshold. In another example, the reference power may be set based on fan speed, nozzle pressure ratio, and other parameters. Yet further modifications could be implemented by a person of ordinary skill in the art in view of the present disclosure, which modifications would be within the scope of the present technology.

The invention claimed is:

1. A method for operating an engine, the method comprising:
   monitoring an engine core temperature;
   when the engine core temperature is below an engine thermal limit adjusted for a level of deterioration of the engine, setting an output power of the engine in accordance with a reference power based on non-thermal limits of the engine; and
   when the engine core temperature is near or above the engine thermal limit adjusted for the level of deterioration of the engine, setting the output power of the engine to a value lower than the reference power based on non-thermal limits of the engine to reduce the engine core temperature.

2. The method as defined in claim 1, wherein setting the output power of the engine in accordance with the reference power based on non-thermal limits of the engine comprises selecting a minimum between an output power based on a mechanical engine limit and an output power based on an additional engine limit.

3. The method as defined in claim 1, wherein monitoring the engine core temperature comprises establishing the level of deterioration of the engine based on a reference condition of the engine.

4. The method as defined in claim 3, wherein the engine is an aircraft engine and the reference condition of the engine is a flight take-off condition.

5. The method as defined in claim 4, wherein establishing the level of deterioration of the engine based on a reference condition of the engine comprises:
   during a take-off phase, recording a take-off value for an engine core temperature; and
   computing the level of deterioration of the engine by comparing the take-off value for the engine core temperature to an expected take-off value for an engine core temperature of a new engine without deterioration at a same flight condition.

6. The method as defined in claim 3, wherein establishing the level of deterioration of the engine based on a reference condition of the engine comprises adjusting the level of deterioration of the engine over time.

7. A system for operating an engine, the system comprising:
   a processor; and
   a non-transitory computer-readable medium having stored thereon program instructions executable by the processor for:
   monitoring an engine core temperature;
   when the engine core temperature is below an engine thermal limit adjusted for a level of deterioration of the engine, setting an output power of the engine in accordance with a reference power based on non-thermal limits of the engine; and
   when the engine core temperature is near or above the engine thermal limit adjusted for the level of deterioration of the engine, setting the output power of the engine to a value lower than the reference power based on non-thermal limits of the engine to reduce the engine core temperature.

8. The system as defined in claim 7, wherein setting the output power of the engine in accordance with the reference power based on non-thermal limits of the engine comprises selecting a minimum between an output power based on a mechanical engine limit and an output power based on an additional engine limit.

9. The system as defined in claim 7, wherein monitoring the engine core temperature comprises establishing the level of deterioration of the engine based on a reference condition of the engine.

10. The system as defined in claim 9, wherein the engine is an aircraft engine and the reference condition of the engine is a flight take-off condition.

11. The system as defined in claim 10, wherein establishing the level of deterioration of the engine based on a reference condition of the engine comprises:
    during a take-off phase, recording a take-off value for an engine core temperature; and
    computing the level of deterioration of the engine by comparing the take-off value for the engine core temperature to an expected take-off value for an engine core temperature of a new engine without deterioration at a same flight condition.

12. The system as defined in claim 9, wherein establishing the level of deterioration of the engine based on a reference condition of the engine comprises adjusting the level of deterioration of the engine over time.

13. A method for operating an engine, comprising:
    setting an output power of the engine in accordance with a reference power based on non-thermal limits of the engine;
    detecting that an engine core temperature is near or exceeds an engine thermal limit, said engine thermal limit adjusted based on a level of deterioration of the engine; and
    in response to the detecting, setting the output power of the engine to a value lower than the reference power until the engine core temperature reaches the engine thermal limit adjusted based on the level of deterioration of the engine.

14. The method as defined in claim 13, wherein setting the output power of the engine in accordance with the reference power based on non-thermal limits of the engine comprises selecting a minimum between an output power based on a mechanical engine limit and an output power based on an additional engine limit.

15. The method as defined in claim 13, wherein detecting that the engine core temperature of the engine is greater or equal to the engine thermal limit further comprises establishing the level of deterioration of the engine based on a reference condition of the engine.

16. The method as defined in claim 15, wherein the engine is an aircraft engine and the reference condition of the engine is a flight take-off condition.

17. The method as defined in claim 16, wherein establishing the level of deterioration of the engine based on the reference condition of the engine comprises:
   during a take-off phase, recording a take-off value for an engine core temperature; and
   computing the level of deterioration of the engine by comparing the take-off value for the engine core temperature to an expected take-off value for an engine core temperature without deterioration at a same flight condition.

18. The method as defined in claim 15, wherein establishing the level of deterioration of the engine based on a reference condition of the engine comprises adjusting the level of deterioration of the engine over time.

\* \* \* \* \*